United States Patent Office 3,517,168
Patented June 23, 1970

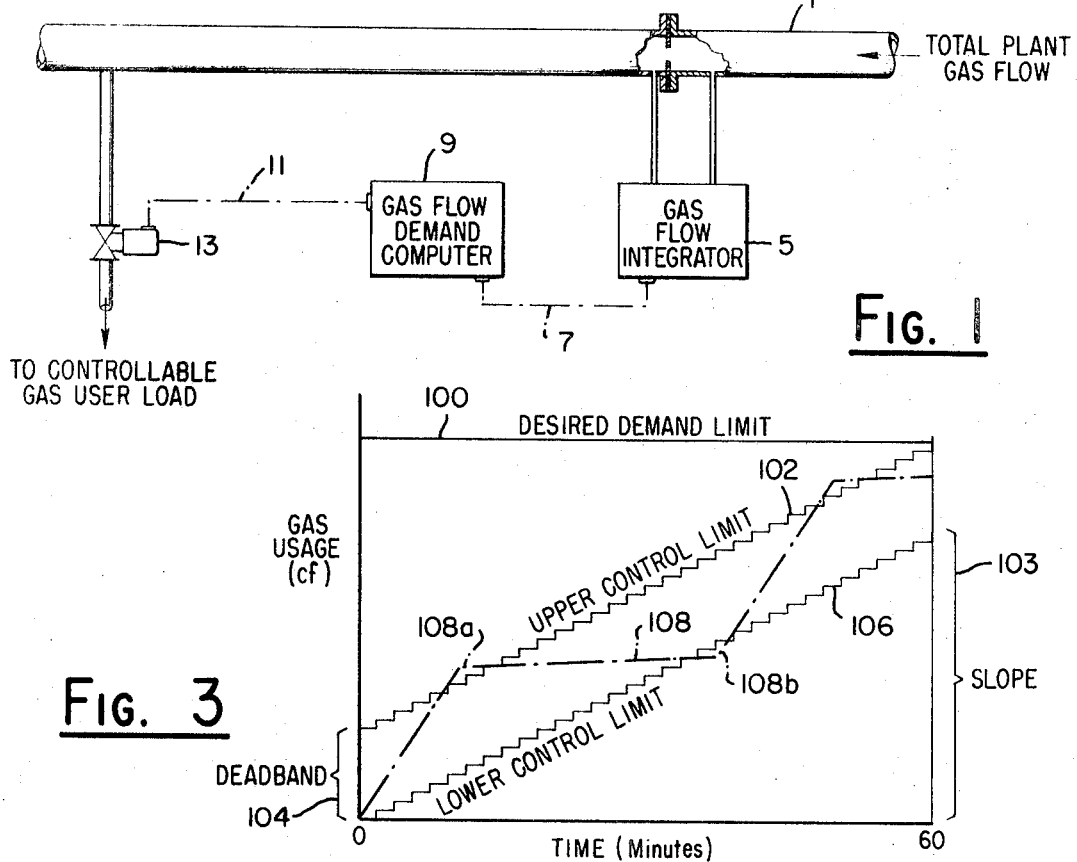
Fig. 1
Fig. 3
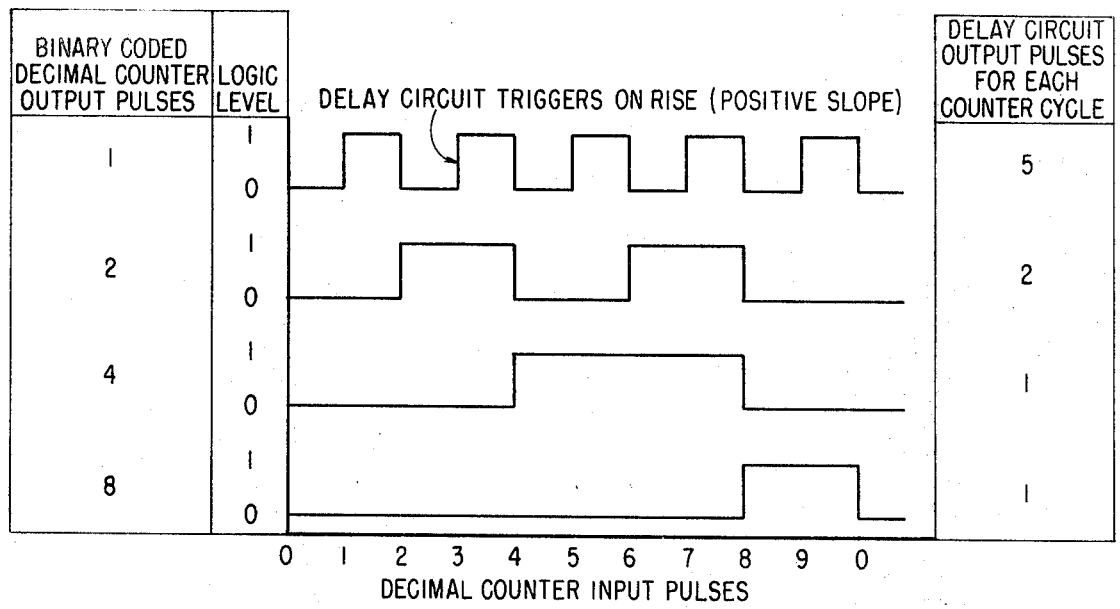
Fig. 4

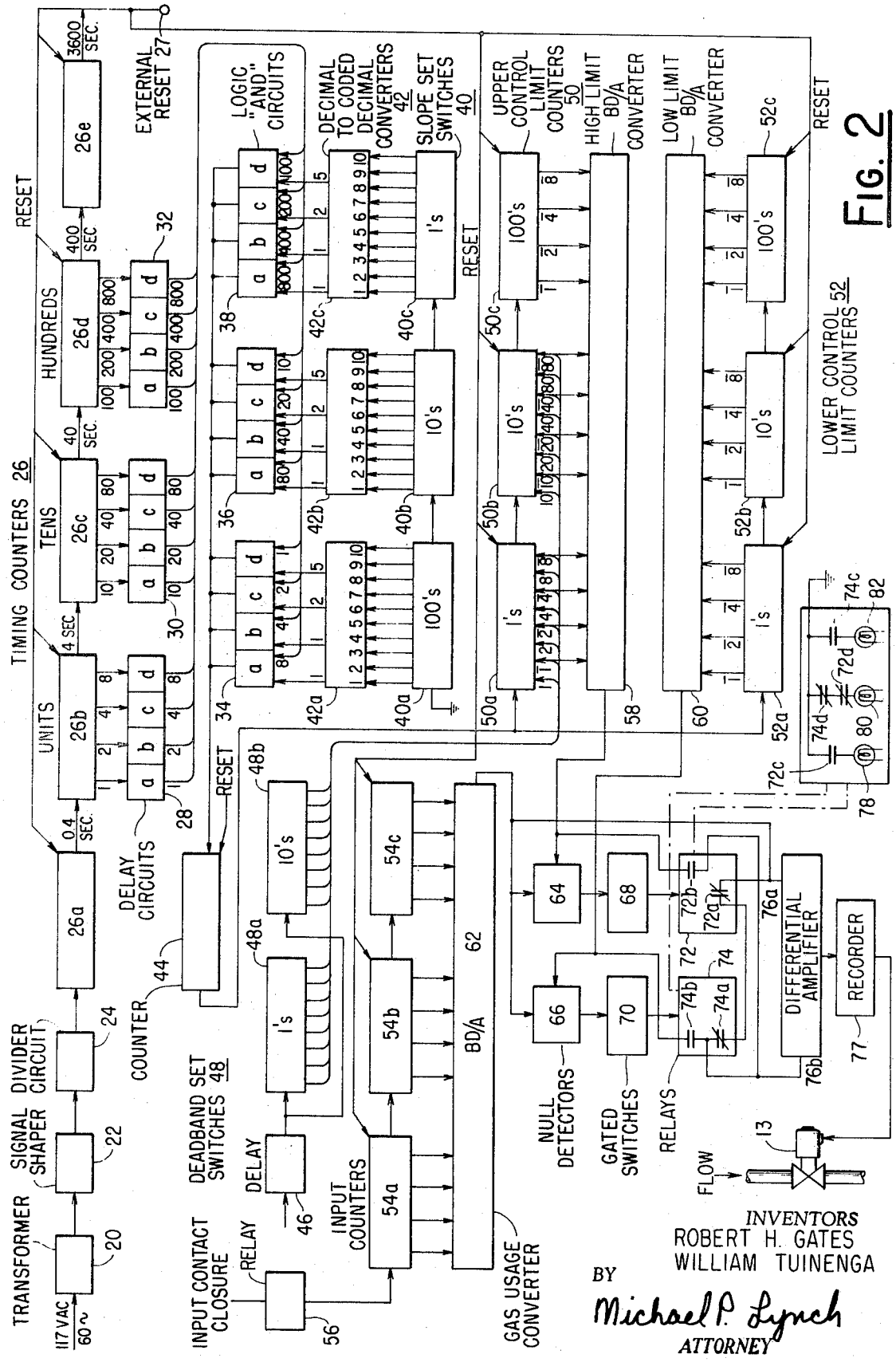

---

3,517,168
GAS DEMAND COMPUTER CONTROL SYSTEM
Robert H. Gates, Eastlake, Ohio, and William Tuinenga, Homewood, Ill., assignors to Bailey Meter Company, a corporation of Delaware
Filed Apr. 25, 1968, Ser. No. 724,022
Int. Cl. G06f 7/02; G05d 7/06
U.S. Cl. 235—92          7 Claims

ABSTRACT OF THE DISCLOSURE

A computer system for controlling gas usage within internally generated control limits, having binary counters which respond to inputs representing maximum and minimum gas usage limits and to an input representing total gas usage. Output signals from the binary counters are converted to analog voltage signals, said signals compared to determine deviation of total gas usage beyond the control limits. The presence of a deviation between said signals produces a control signal which regulates gas usage to establish the total gas usage within the control limits.

BACKGROUND OF THE INVENTION

Field of the invention

This invention relates to control systems and, more particularly, to a gas demand control system particularly adapted to control industrial gas usage within desired limits.

Description of the prior art

Plant contracts with local utility companies for the purchase of gas generally set the cost at a fixed amount per unit providing the plant does not exceed an established usage rate during a specific period of time. This period of time, often referred to as a demand period, may vary in length from minutes to hours. The contract, while penalizing the plant for excess gas usage during a demand period, does not allow for reduction of the cost per unit if the plant uses less gas than permitted during a demand period. Therefore, it is desirable to maintain gas usage at a rate equal to or approaching the established limit.

Control systems, which rely on an operator's interpretation of measured variables, do not provide the response and accuracy required to maintain plant gas usage at an optimum level. The computer control system which is the subject of this invention automatically measures the gas usage of a plant and compares this value to preset control limits. Any deviation beyond these limits will initiate regulation of the plant gas usage to maintain the gas usage within the control limits.

SUMMARY OF THE INVENTION

The gas demand computer, which is the subject of this invention, provided individual adjustable selector switches to establish the desired maximum and minimum control limits as well as an adjustable selector switch to establish a deadband between said control limits within which no gas usage control is initiated. The output signals of the limit selector switches enable gating means which pass timing pulses to counters, which in turn provide output signals to analog converters. The analog voltage representation of the preset control limits are compared to an analog voltage representing total gas usage. Any deviation of said gas usage signal beyond the control limits results in an output signal proportional to the deviation. A recorder, which is insensitive to gas usage within the deadband established by the control limits, responds to a deviation beyond said limits by issuing a control signal of proper polarity and magnitude to restore gas usage within the deadband.

BRIEF DESCRIPTION OF THE DRAWING

FIG. 1 is a schematic illustration in functional block diagram of the basic operation of the disclosed embodiment of the invention.

FIG. 2 is a block diagram of a gas demand computer control system according to one illustrative embodiment of this invention.

FIG. 3 is a graph illustrating the operation of the embodiment of FIG. 2.

FIG. 4 is a pulse graph illustrating the relationship of decimal pulses and binary coded decimal pulses as utilized in the embodiment.

DESCRIPTION OF THE PREFERRED EMBODIMENT

Referring to FIG. 1, we show a functional block diagram of a gas flow control system embodying our gas demand computer.

The gas flow rate in conduit 1 is measured by gas flow integrator 5. Gas flow integrator 5 transmits to gas demand computer 9, via cable 7, a series of electrical contact closures proportional to gas flow rate in conduit 1. Gas demand computer 9 converts the contact closure input into a representative analog signal. This signal is then compared to preset liimts established in gas demand computer 9. A deviation from said preset limits by the gas flow rate signal will result in an output signal in cable 11 from computer 9 equal to the net deviation and of such a polarity as to re-position gas flow control valve 13 such that the output signal from integrator 5 will be established within the preset limits of computer 9.

The gas demand computer of FIG. 1 is illustrated schematically in the functional block diagram of FIG. 2. The operation of the gas demand computer can be considered as providing three distinct operations, so related within the computer as to maintain gas usage at or approaching the demand limit based on the consumer contract. The operations performed by said computer include establishing preset control limits, converting gas flow integrator output signals into analog signals representing gas flow usage, and comparing said analog signals to said preset limits and producing a flow control signal proportional to the deviation of said analog signal from said preset limits.

Prior to a detailed discussion of the limit setting function of the gas demand computer operation, a discussion of a graphical illustration of said operation, as depicted in FIG. 3, will prove appropriate. The ordinates of this graph are cubic feet of gas usage while the abscissae are the time elapsed in the demand period. The demand period is arbitrarily selected to be one hour, a typical demand period established in a consumer contract.

The solid horizontal line 100 represents the desired demand limit based on the consumer contract. Adjustable control limits 102 and 106 establish the preset limits within which gas usage rate 108 is to be maintained during a hour demand period. Variation of gas usage rate within the deadband 104 between control limits 102 and 106 will not produce a gas flow corrective output signal from the gas demand computer. Gas usage rate 108, as shown by curve 108, which extends beyond control limits 102 and 106, as represented by points 108a and 108b, will cause the gas demand computer to produce a gas flow corrective signal. In the case of a deviation as indicated by point 108a, the gas demand computer will produce an analog voltage signal proportional to the deviation and of such a polarity as to decrease the gas flow and return the gas usage 108 within the preset limits. Gas usage deviation at point 108b likewise produces a computer corrective analog voltage signal but of opposite polarity and of a magnitude proportional to said deviation such that the gas flow rate is increased to establish gas usage within the preset limits 102 and 108.

Deadband 104 is adjustable, thus permitting sensitive control of gas usage by reducing deadband 104 to a minimum or expanding deadband 104 to eliminate cyclic computer control caused by unimportant, minimal variations in gas usage. This fundamental description of the operation of the gas demand computer will now be expanded with reference to FIG. 2.

The control limits 102 and 106 of FIG. 3 are established by mechanical positioning of slope set thumbwheel switches 40a, 40b and 40c and deadband set thumbwheel switches 48a and 48b as illustrated in FIG. 2. After the demand limit 100 is determined and the desired deadband 104 selected a count is set in slope set thumbwheel switches 40 which represents the demand limit minus the deadband, or the slope 103. The slope set thumbwheel switches determine the slope 103 or the final count to be registered in lower control limit counters 52 at the end of a demand period. The upper control limit counters 50 respond to both the setting of slope thumbwheel switches 40 and the deadband set thumbwheel switches 48 such, that, at the start of each demand period, the upper control limit 102 is offset from the lower control limit 106 by an amount equal to the mechanical setting of deadband set thumbwheel switches 48. The control limits 102 and 106 remain parallel during the demand period, however, as each is the direct result of the setting of slope thumbwheel switches 40.

At the expiration of the one hour demand period, the upper control limit 102 equals the contract usage limit and the lower control limit 106 equals the value set on the slope set thumbwheel switches 40a, 40b and 40c.

Referring now to FIG. 2, we show a series of decimal counters 26a, 26b, 26c, 26d, 26e which respond to pulses generated as a function of 60 Hz. line frequency, said counters establishing the time increments and duration of the demand period. As noted previously, a one hour demand period is typical and has, therefore, been selected for this discussion.

Transformer 20 reduces the 60 Hz. line voltage input to a voltage level compatible with the system components. The 60 Hz. sine wave output signal from transformer 20 is applied to signal shaper 22 which can be any one of many circuits that are capable of converting said sine wave into a 60 Hz. square wave. The square wave output of shaper 22 is subsequently transmitted to divider circuit 24. The divider circuit 24 puts out one square wave pulse for every two input pulses. A typical device which is capable of functioning as divider 24 is a counter which resets at the count of two. The output pulses from divider 24 step decimal counter 26a until a count of 12 is reached at which time said counter is reset. Each time counter 26a is reset, it puts out a pulse which steps counter 26b. Due to the divider operation of circuit 24, the reset pulse of counter 26a, which steps counter 26b, occurs at 1/24 frequency of the 60 Hz. line signal or occurs every 0.4 second. Decimal counters 26b, 26c, 26d each count ten pulses of the previous counter and then reset. Therefore, the pulses stepping counter 26c occur every 4 seconds, while the pulses stepping counter 26d occur every 40 seconds. The output pulses of counter 26d, which occur every 400 seconds, step counter 26e which counts to nine and puts out a reset pulse which resets all counters. This reset pulse occurs every 3600 seconds or 1 hour and denotes the end of the demand period. A new demand period can also be started manually at any time by depressing the demand period reset pushbutton 27.

Decimal counter 26b functions as a units counter, counter 26c as a tens counter and counter 26d as a hundreds counter. Each of the four binary coded decimal outputs of counters 26b, 26c, 26d are applied as input pulses to delay circuits 28, 30 and 32 respectively. The delay circuits respond to said input signals by producing an output pulse for every positive trigger slope of the counter output pulses. The response of delay circuits 28, 30 and 32 to the binary coded decimal outputs pulses of counters 26b, 26c, 26d respectively is illustrated graphically in the pulse chart of FIG. 4.

The ordinates of this graph represent the logic levels of the binary coded decimal output pulses of the decimal counters while the abscissae represents the decimal input pulses to said counters. The graph of FIG. 4 is applicable to the operation of counters 26b, 26c, 26d. The number of delay circuit output pulses produced for each of the four binary coded decimal outputs during a counter cycle of ten input pulses is noted in the column at the right of the graph.

Discussing FIG. 4 with reference to counter 26b and delay circuit 28, it is apparent that the "1" output rises from a logic ZERO to a logic ONE five times during each cycle of counter 26b and thus triggers five output pulses from delay 28a. Similarly, during each cycle, the "2" output triggers two output pulses from delay 28b, while the "4" and "8" outputs of counter 26b each produce one output pulse from delays 28c and 28d respectively.

Recalling that a complete cycle of counter 26b occurs 900 times in the demand period, it follows that delay 28a will produce 4500 output pulses in each complete demand period, while delay 28b will produce 1800 output pulses and delays 28c and 28d will each produce 900 pulses. The 10's counter 26c, which exhibits a cycle time of 40 seconds, has outputs "1," "2," "4" and "8" which put out one-tenth the number of pulses that the 1's counter 26b puts out. It follows, therefore, that the output pulses of delay circuits 30a, 30b, 30c, 30d which respond to the output pulses of "1," "2," "4" and "8" of counter 26c, would also be one-tenth the output pulses of delay 28. Therefore, the output pulses produced by delay circuits 30a, 30b, 30c, 30d during a complete demand period are 450, 180, 90 and 90 respectively. The output pulses of delay circuits 32a, 32b, 32c, 32d which respond to the "1," "2," "4" and "8" outputs of 100's counter 26d occur at a rate one-tenth that of delay circuit 30; therefore, during a complete demand period, the output pulses produced by delay circuits 32a, 32b, 32c 32d are 45, 18, 9 and 9 respectively.

The pulses which step upper control limit counters 50, and lower control limit counters 52, are the output pulses of counter 44, said counter transmitting an output pulse for every nine input pulses received from the multiple AND circuits 34, 36 and 38. Each of the multiple AND circuits 34, 36 and 38 consists of four independent logic AND circuits 34a 34b, 34c, 34d; 36a, 36b, 36c, 36d, and 38a, 38b, 38c, 38d. Logic ONE output pulses are transmitted by each independent AND circuit to counter 44 when logic ONE inputs are present at both AND inputs.

The input pair to each independent AND consists of an input from one of the delay circuits 28, 30, 32 and an input from one of three decimal to 5–2–1–1 decimal converters 42a, 42b 42c. The converters 42a, 42b, 42c transform the decimal setting selected on mechanical thumbwheel switches into a 5–2–1–1 coded decimal value. It is recalled that the pulse pattern from delay circuits 28, 30 and 32 is also 5–2–1–1; and, therefore, the inputs to AND circuits 34, 36 and 38 are compatible. The application of the 5–2–1–1 decimal converter is not novel as its use is known to those skilled in the art.

For the purpose of discussion, assume the three slope set thumbwheel switches 40a, 40b, 40c have been set to a value of 742 to establish control limits. The divisions on each switch represent 1000 cubic feet of gas, and switch 40a designates 100's, switch 40b designates 10's and switch 40c designates 1's.

Arbitrarily selecting the value 742 as the lower control limit, decimal converter 42a enables outputs "5" and "2" representing 700, decimal converter 42b enables outputs "2," "1" and "1" representing 40 and decimal converter 42c enables outputs "2" representing 2. The logic AND inputs corresponding to said enabled outputs of the decimal converters 42a, 42b, 42c are, therefore, conditioned to pass to the input of counter 44 all the delay circuit output pulses which are applied to the second inputs of said enabled AND circuits.

The delay circuits 28 outputs resulting from the output pulses of 1's counter 26b are applied as inputs to logic AND circuits 34 where each of the four outputs of delay 28 is paired with an input from 5–2–1–1 diode matrix 42a, said matrix corresponding to the 100's slope set thumbwheel switch 40a. The "1" output of delay 28a is paired with the "5" output of matrix 42a in AND circuit 34d and the "2" output of delay 28b is paired with the "2" output of matrix 42a in AND circuit 34c. The "4" and "8" outputs of delay circuits 28c and 28d respectively are each paired with a "1" output of matrix 42a in AND circuits 34b and 34a respectively. The selection of the 5–2–1–1 code and the input arrangement for AND circuit 34 is based on the delay circuit 28 output pattern of 5–2–1–1 graphically represented in FIG. 4.

The input arrangement thus described for AND circuit 34 is repeated in AND circuits 36 and 38, wherein the output pulses of delay circuit 30, which are triggered by 10's counter 26c, are paired with the outputs of diode matrix 36, which corresponds to the 10's slope set thumbwheel switch 40b. Similarly, the output pulses of delay 32, which are triggered by 100's counter 26d, are paired with the output of diode matrix 38, which corresponds to the 1's slope set thumbwheel switch 40c.

This arrangement, in the case of a slope seting of 742 in which "5" and "2" outputs of diode matrix 42a are enabled, will gate the "1" and "2" output pulses of delay circuits 28a and 28b through AND circuits 34c and 34d to step counter 44. Therefore, during a complete demand period, AND circuit 34c will pass 1800 delay 28b pulses to counter 44, while AND circuit 34d will pass 4500 delay 28a pulses to counter 44. The slope setting of 742 will also enable the "2," "1" and "1" outputs of diode matrix 42b and the "2" output of matrix 42c. The effect of enabling outputs "2," "1" and "1" of matrix 42b will be the gating of output pulses from delay circuits 30b, 30c and 30d through AND circuits 36c, 36d and 36a respectively. Therefore, during a complete demand period, AND circuit 36c will gate 180 pulses from delay 30b to counter 44, while AND circuits 36b and 36a will each gate 90 pulses from delay circuits 30c and 30d respectively to counter 44. The units value of 2 in slope set switch 40c will enable the "2" output of matrix 42c, which will gate pulses from delay 32b through AND circuit 38c to counter 44. During a complete demand period, 18 pulses from delay 32b will step counter 44. The total number of pulses gated to counter 44 during a demand period will total 6,678 and will represent a staircase ramp input to counter 44.

Counter 44 transmits one output pulse for every nine input pulses received from the AND circuits and, therefore, acts as a divider whereby the 6,678 input pulses are represented by 742 output pulses, the same number set on the slope set thumbwheel switches. This divider function of counter 44 counter-balances the multiplier function of counter 26e. Each output pulse from counter 44 steps the upper control limit counters 50 and the lower control limit counters simultaneously, producing the control limits 102 and 106 of FIG. 3.

The output pulses of AND circuits 34, 36 and 38 tend to be unevenly spaced, and, therefore, a ramp runction generated by a minimum number of said pulses tends to be irregular if the number of pulses are few. This undesirable condition, which could affect the uniformity of control limits generated by counters 50 and 52, is minimized by the operation of counter 26e, which, in addition to establishing a demand period, functions as a multiplier of output pulses from counters 26b, 26c, 26d. The nine count cycle of counter 26e increases the output pulses of said counters and their respective delay circuits by a factor of nine thereby reducing the adverse effect of the individual pulses. The output pulses thus established produce a desirable staircase ramp input to counter 44 where a nine count cycle produces a total pulse output equal to the count value prior to multiplication by counter 26e.

In a situation where optimum system control is desired, the upper and lower control limits would be identical and the slope set thumbwheel switches 42 would be set at the contract demand limit and would determine the final count value in both upper control limit counters 50 and the lower control limit counters 52.

However, it is generally desirable to establish a deadband between the control limits, within which no control is provided. This deadband is provided by deadband set thumbwheel switches 48. The deadband or difference between the upper and lower control limits is set on these switches. At the start of a demand period, delay circuit 46 receives a trigger pulse. The output pulse from delay 46 gates the contents of thumbwheel switches 48a and 48b to the upper control limit counters 50a and 50b. Therefore, at the beginning of the demand period, counters 50 start out with a count equal to the deadband setting while lower control limit counters 52 start out at zero. Therefore, at the end of a demand period, wherein a value of 742 has been set on switches 40, and an equal number of pulses from counter 44 step counters 50 and 52, there will be a count of 742 in lower control limit counters 52 and a count of 742 plus the deadband value in upper control limit counters 50.

Limit counters 50 and 52 each drive a binary decimal to analog converter which converts the digital value present in the respective counters to a proportional analog voltage signal. Upper control limit counter 50 drives converter 58 which transmits its analog voltage signal, representing upper control limit, to null detector 64 wherein it is compared to an analog signal representing gas usage. An analog signal output from converter 60, representing the lower control limit present in converter 52, is applied to null detector 66 wherein it is also compared to the analog signal representing gas usage.

The analog input signal to null detectors 64 and 66 representing gas usage is derived from converter 62 which is driven by input counters 54. The input counters 54 are stepped by relay 56 contact closures which are generated at a rate equal to the contact closure inputs from the gas flow integrator 5 of FIG. 1. As noted previously, each contact closure from said integrator represents 1000 cubic feet of gas, as does each output pulse from counter 44.

If the gas usage rate is within the preset control limits, thus producing an analog signal from input converter 62 which, when applied to null detector 64, is less than the analog signal from upper control limit converter 58, then a logic ZERO appears at the output of null detector 64. The gated switch 68 and relay 72 will remain de-energized. Likewise, if the input analog signal from converter 62, when applied to null detector 66, is greater than the analog signal from lower control limit converter 60, a logic ZERO output will be present at the output of null detector 66. Under these conditions; namely, logic ZERO outputs present at both null detectors 64 and 66, relay contacts 72a and 74a of relays 72 and 74 respectively will remain closed thereby providing an electrical shunt across the inputs 76a and 76b of differential amplifier 76. Therefore, amplifier 76 and the recorder 77 driven by the output of amplifier 76 are non-responsive to gas usage variation which occurs within the preset control limits. However, gas usage deviation, which exceeds the upper control limit, will establish a converter 62 analog signal which, when applied to null detector 64, will exceed the upper control analog signal input from converter 58. This excursion above the upper control limit will produce a logic ONE signal at the output of null detector 64 which will energize gated switch 68 which in turn energizes relay 72. Relay 72 contacts 72a are then opened, removing the shunt across amplifier 76 inputs, and contacts 72b are closed. Amplifier 76 is now responsive to the difference of the analog voltage signal representing the upper control limit, which is applied to input 76b, and the analog voltage signal representing gas usage which is applied to input 76a. This voltage difference detected by amplifier 76 and transmitted to recorder 77 produces a recorder output control signal which is applied to the flow control valve 13 to reduce gas flow rate sufficiently to reduce the analog signal from converter 62 to a value less than the upper control limit signal from converter 58. Recorder 77 is a type comparable to the Bailey Meter Company Model WM55 which responds to an input variable signal by recording the variable value and generating a control output signal proportional to the input signal. The zero reference of the recorder incorporated in this system is set at midrange of the recorder so that recorder 77 is capable of responding to bi-directional input signals.

A converter 62 analog signal input to null detector 66, which is less than the lower control limit analog signal from converter 60, will cause a logic ONE output from null detector 66 to energize gated switch 70. Relay 74 responds to the output of gated switch 70 by opening contacts 74a, which removes the shunt from amplifier 76 inputs, and closing contacts 74b thereby applying the lower control limit analog signal from converter 60 to input 76b of amplifier 76. Once again amplifier 76 responds to the voltage difference between the control limit analog signal of input 76b and the gas usage analog signal of input 76a by applying a signal proportional to this difference to recorder 77 which transmits a control signal to flow control valve 13 which is proportional to said difference and of such a polarity as to increase the gas flow in conduit 1 of FIG. 1 to establish gas usage within the preset control limits.

The electrical shunt provided at the amplifier input during periods of nominal gas usage reserves the full control capacity of the recorder for corrective control operation when the gas usage deviates beyond preset limits. This reservation of full control capacity is maintained regardless of the deadband selected.

In addition to the corrective control signal produced by recorder 77, relay contacts 72c, 72d and 74c, 74d and lamps 78, 80 and 82 are included to provide visual indication of gas usage deviation. Under nominal operating conditions, wherein gas usage is within preset control limits, the normally closed contacts 72d and 74d cause amber lamp 80 to be lit. A deviation from nominal operating conditions which produces a logic ONE output from detector 64 in response to excessive gas usage will cause contacts 72d to open, removing voltage amber lamp 80, and causing contacts 72c to close, lighting red lamp 78. Similarly, a logic ONE output of detector 66 will open contacts 74d, removing voltage from amber lamp 80, and close contacts 74c, lighting green lamp 82, indicating insufficient gas usage.

While we have shown and described one illustrative embodiment of method and apparatus for controlling the usage of gas, it is understood that the concepts thereof may be applied to other embodiments without departing from the spirit and scope of this invention. For example, our invention can be considered a basic power demand computer which can be applied to systems powered by gas, electricity, etc. wherein the usage rate is represented by contact closures.

What we claim as new and desire to secure by Letters Patent of the United States is:

1. A gas demand computer system for determining gas usage rate within preset limits during a specified period of time known as demand period, which comprises:

an input circuit responding to line frequency excitation voltage and producing output square wave pulses at a predetermined rate, said pulses representing increments of time in the demand period;

timing counters for totalizing the pulse output of said input shaping circuit, said counters including a plurality of output lines each corresponding to one distinct count condition, said counters providing an output signal only on that one of said output lines corresponding to the count condition then existing, said timing counters wired to reset at the end of a count representing the demand period;

upper control limit counters for establishing the maximum allowable gas usage;

lower control limit counters for establishing minimum desired gas usage;

a first adjustable selector means for setting a count value in said upper control limit counter at the start of the demand period;

a second adjustable selector means for establishing a desired slope of the control limits generated by the upper and lower control limit counters during the demand period;

diode matrices responding to the second adjustable selector means by establishing a pattern of voltage signals representing a gas usage value equal to the maximum allowable gas usage value minus the count value set in the upper control limit counters by the first adjustable selector means;

individual gating means for each output line of the timing counters, each gating means being enabled during the presence of a voltage signal from said diode matrices to permit the transfer of available timing counters output signals, the output of said gating means representing a ramp function initiated at the start of the demand period and comprised of a number of timing counters output pulses equal to the slope value established by the second adjustable selector means; said gated output pulses stepping the upper and lower control limit counters simultaneously thereby generating upper and lower gas usage control limits which extend in a parallel relationship at a slope equal to the value established by said second adjustable selector means, said upper control limit offset from said lower control limit by the count value set in said counter by the first adjustable selector means, said offset between the control limits establishing a deadband within which no gas usage control is initiated;

input counters for totalizing the pulses of a gas flow integrator, said pulses representing total gas usage; said input counters producing output signals proportional to the gas usage pulses of said gas flow integrator;

a first converter means responding to the output signals of said input counters to produce a direct current analog voltage signal representative of the measured gas usage;

a second converter means responding to the output signals of said upper control limit counters to produce a direct current analog voltage signal representative of maximum allowable gas usage;

a third converter means responding to the output signals of said lower control limit counters to produce a direct current analog voltage signal representative of minimum desired gas usage;

a comparator circuit which compares the analog output of said first converter means with the analog output voltages of the second and third converter means and produces an analog output voltage signal representing the deviation of said first converter voltage signal above the second converter voltage signal, or the deviation of said first converter voltage signal below the third converter voltage signal;

a differential amplifier responsive to the deviation between the signals of the first converter and the second and third converters and generating a signal, the magnitude and polarity of which is a function of said deviation; and a recorder responding to the output signal of said amplifier circuit by producing a control signal of proper polarity and magnitude to maintain gas usage within the preset control limits.

2. A gas demand computer control system as claimed in claim 1 wherein the timing, upper control limit, lower control limit and input counters are of the binary decimal type.

3. A gas demand computer control system as claimed in claim 1 wherein the first, second and third converter means are of the binary decimal to analog type.

4. A gas demand computer control system as claimed in claim 1 wherein the comparator circuit comprises:
  a first null detector which accepts as inputs the analog voltage output signals of said first and second converter means and produces a voltage output only when said first converter output exceeds said second converter output;
  a second null detector which accepts as inputs the analog voltage output signals of said first and third converter means and produces a voltage output only when said first converter output is less than said third converter output;
  a first electric relay having at least one set of normally open and normally closed contacts, said relay being energized by the output signal of said first null detector;
  a second electric relay having at least one set of normally open and normally closed contacts, said relay being energized by the output signal of said second null detector;
  a first electrical conductor connected between first and second terminals of said amplifier and having connected in series therewith a normally closed set of relay contacts of both the first and second electric relays;
  a second electrical conductor connected between the output of the second converter means and the second terminal of the amplifier and having connected in series therewith a normally open set of contacts of the first electric relay;
  a third electrical conductor connected between the output of the third converter means and the second terminal of the amplifier and having connected in series therewith a normally open set of contacts of the second electric relay; and
  a fourth electrical conductor connected between the output of the first converter means and the first input terminal of the amplifier;

whereby, in the absence of an output of either the first or second null detector, the first electrical conductor will act as a shunt across the terminals of the amplifier thereby preventing control response of the recorder; however, an output of the first null detector indicating excessive gas usage, will energize the first electric relay resulting in the opening of its normally closed contacts which removes the shunt from the amplifier terminals and the closing of the normally open contacts of the second electrical conductor, the closing of said contacts transmits the output signal of the second converter means to the second terminal which causes the amplifier to respond to the voltage difference between the signals applied to the first and second terminals of the amplifier by transmitting a signal to the recorder, the presence of an output signal from the second null detector would likewise remove the electrical shunt from the amplifier terminals and apply the output signal of the third converter means to the second terminal which would cause the amplifier to respond to the difference between electrical output signals of the first and third converter means, the degree and direction of control initiated by the recorder being a function of the magnitude and polarity of the output signal of the differential amplifier.

5. A gas demand computer control system as claimed in claim 1 wherein said first and second adjustable selector means are multi-position decimal switches.

6. A gas demand computer control system as claimed in claim 1 further comprising a plurality of lamps responsive to the operation of said comparator circuit relays, one of which is illuminated during periods of excess gas usage, another which is illuminated during periods of insufficient gas usage and yet another which is illuminated during periods of acceptable gas usage.

7. A gas demand computer control system as claimed in claim 1 further including a manual reset circuit for said timing counters.

References Cited
UNITED STATES PATENTS 3,387,121  1968  Maczyzak et al. ___ 235—151.21

MALCOLM A. MORRISON, Primary Examiner

E. J. WISE, Assistant Examiner

U.S. Cl. X.R.

235—151.21, 151.34